US008919444B2

(12) United States Patent
Clay et al.

(10) Patent No.: US 8,919,444 B2
(45) Date of Patent: Dec. 30, 2014

(54) SYSTEM AND METHOD FOR ENHANCED WELLBORE PERFORATIONS

(71) Applicant: Owen Oil Tools, Houston, TX (US)

(72) Inventors: Matthew Clay, Fort Worth, TX (US); James Talavera, Houston, TX (US)

(73) Assignee: Owen Oil Tools LP, Houston, TX (US)

( * ) Notice: Subject to any disclaimer, the term of this patent is extended or adjusted under 35 U.S.C. 154(b) by 0 days.

(21) Appl. No.: 13/745,545

(22) Filed: Jan. 18, 2013

(65) Prior Publication Data
US 2013/0180701 A1 Jul. 18, 2013

Related U.S. Application Data

(60) Provisional application No. 61/587,842, filed on Jan. 18, 2012.

(51) Int. Cl.
E21B 43/117 (2006.01)
E21B 43/11 (2006.01)

(52) U.S. Cl.
CPC .............. E21B 43/11 (2013.01); E21B 43/117 (2013.01)
USPC .............. 166/297; 166/55; 175/4.6; 102/306

(58) Field of Classification Search
CPC ............................ E21B 43/116; E21B 43/117
USPC ................. 166/297, 55; 175/4.6; 102/306
See application file for complete search history.

(56) References Cited

U.S. PATENT DOCUMENTS

| 2,674,620 | A | * | 4/1954 | Sonia et al. ............. 204/157.89 |
| 2,760,434 | A |   | 8/1956 | Ruth |
| 2,766,828 | A |   | 10/1956 | Rachford, Jr. |
| 3,054,938 | A | * | 9/1962 | Meddick ................. 102/310 |
| 3,058,522 | A |   | 10/1962 | McElheny |
| 3,087,424 | A |   | 4/1963 | Levin |
| 3,157,232 | A |   | 11/1964 | Ramos et al. |
| 3,188,955 | A | * | 6/1965 | Brown .................... 102/306 |
| 3,659,658 | A |   | 5/1972 | Brieger |
| 4,018,293 | A |   | 4/1977 | Keller |
| 4,122,899 | A |   | 10/1978 | Brieger |
| 4,261,956 | A |   | 4/1981 | Adlhart |
| 4,391,337 | A |   | 7/1983 | Ford et al. |
| 4,446,920 | A |   | 5/1984 | Woytek et al. |
| 4,456,069 | A |   | 6/1984 | Vigneri |

(Continued)

FOREIGN PATENT DOCUMENTS

| EP | 1918507 A1 | 5/2008 |
| WO | 2005035940 A1 | 4/2005 |
| WO | 2009042480 A1 | 4/2009 |

OTHER PUBLICATIONS

PCT/US13/22296—International Search Report dated Mar. 29, 2013.

Primary Examiner — Giovanna Wright
(74) Attorney, Agent, or Firm — Mossman, Kumar & Tyler PC

(57) ABSTRACT

An apparatus for perforating a subterranean formation may include a casing, an energetic material, a liner, and an acid-generating material. The casing may have a slotted end configured to receive a detonator cord, and an open end. The energetic material may be disposed in the open end and in ballistic. The liner may enclose the open end, and the liner may include an acid-generating material that is configured to form an acid upon detonation of the explosive material.

20 Claims, 2 Drawing Sheets

(56) References Cited

U.S. PATENT DOCUMENTS

| | | |
|---|---|---|
| 4,475,596 A | 10/1984 | Papst |
| 4,491,185 A | 1/1985 | McClure |
| 4,519,313 A | 5/1985 | Leidel |
| 4,657,089 A | 4/1987 | Stout |
| 4,823,875 A | 4/1989 | Hill |
| 4,844,170 A * | 7/1989 | Gill .............................. 166/297 |
| 4,967,840 A | 11/1990 | Miller |
| 5,088,557 A | 2/1992 | Ricles et al. |
| 5,099,763 A | 3/1992 | Coursen et al. |
| 5,551,344 A | 9/1996 | Couet et al. |
| 5,598,891 A | 2/1997 | Snider et al. |
| 5,690,171 A | 11/1997 | Winch et al. |
| 5,775,426 A | 7/1998 | Snider et al. |
| 6,082,450 A | 7/2000 | Snider et al. |
| 6,158,511 A | 12/2000 | Wesson |
| 6,237,688 B1 | 5/2001 | Burleson et al. |
| 6,263,283 B1 | 7/2001 | Snider et al. |
| 6,336,506 B2 | 1/2002 | Wesson |
| 6,354,219 B1 | 3/2002 | Pratt et al. |
| 6,386,288 B1 | 5/2002 | Snider et al. |
| 6,426,917 B1 | 7/2002 | Tabanou et al. |
| 6,439,121 B1 | 8/2002 | Gillingham |
| 6,494,261 B1 | 12/2002 | Pahmiyer |
| 6,536,524 B1 | 3/2003 | Snider |
| 6,755,249 B2 | 6/2004 | Robison et al. |
| 6,761,219 B2 | 7/2004 | Snider et al. |
| 6,991,044 B2 | 1/2006 | Zhang et al. |
| 7,216,708 B1 | 5/2007 | Bond et al. |
| 7,228,906 B2 | 6/2007 | Snider et al. |
| 7,621,332 B2 | 11/2009 | Haney et al. |
| 7,712,416 B2 | 5/2010 | Pratt et al. |
| 7,819,064 B2 * | 10/2010 | Saenger et al. ............... 102/310 |
| 7,909,115 B2 | 3/2011 | Grove et al. |
| 7,913,761 B2 | 3/2011 | Pratt et al. |
| 8,033,332 B2 | 10/2011 | Haney et al. |
| 8,141,639 B2 | 3/2012 | Gartz et al. |
| 8,342,094 B2 * | 1/2013 | Marya et al. .................. 102/306 |
| 2001/0001418 A1 | 5/2001 | Wesson |
| 2003/0037692 A1 | 2/2003 | Liu |
| 2003/0221831 A1 | 12/2003 | Reddy et al. |
| 2006/0237190 A1 | 10/2006 | Snider et al. |
| 2007/0084604 A1 | 4/2007 | Haney et al. |
| 2007/0240880 A1 | 10/2007 | Olsen |
| 2009/0166038 A1 | 7/2009 | Pauls et al. |
| 2010/0000397 A1 | 1/2010 | Pratt et al. |
| 2010/0071957 A1 | 3/2010 | Huang et al. |
| 2011/0174486 A1 | 7/2011 | Walker et al. |
| 2012/0090845 A1 * | 4/2012 | Huang et al. .................. 166/304 |

* cited by examiner

SYSTEM AND METHOD FOR ENHANCED WELLBORE PERFORATIONS

CROSS-REFERENCE TO RELATED APPLICATIONS

This application claims priority from U.S. Provisional Application Ser. No. 61/587,842 filed Jan. 18, 2012, the disclosure of which is incorporated herein by reference.

BACKGROUND OF THE DISCLOSURE

1. Field of Disclosure

The present disclosure relates to an apparatus and method for perforating a well casing and/or a subterranean formation.

2. Description of the Related Art

Hydrocarbon producing wells typically include a casing string positioned within a wellbore that intersects a subterranean oil or gas deposit. The casing string increases the integrity of the wellbore and provides a path for producing fluids to the surface. Conventionally, the casing is cemented to the wellbore face and is subsequently perforated by detonating shaped explosive charges. When detonated, the shaped charges generate a jet that penetrates through the casing and forms a tunnel of a short distance into the adjacent formation. Often, the region that is perforated, and in particular the walls of the tunnel, may become impermeable due to the stress applied to the formation by the perforating jet as well as stresses that may be caused during the firing of the perforating gun. The loss of permeability and other harmful effects, such as the introduction of debris into the perforation, may adversely affect the flow of hydrocarbons from an intersected hydrocarbon deposit.

In aspects, the present disclosure addresses the need for perforating devices and methods that provide cleaner and more effective well perforations.

SUMMARY OF THE DISCLOSURE

The present disclosure provides devices and methods for efficiently perforating a formation.

In aspects, the present disclosure provides a system for perforating a formation intersected by a wellbore.

In aspects, the present disclosure further provides a method for perforating a formation intersected by a wellbore.

The above-recited examples of features of the disclosure have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

Aspects of the present disclosure provide shaped charges that treat a tunnel formed by a perforating jet with an acid. The acid may be generated, in part, by one or more components making up a liner of the shaped charge. The acid is generated upon an energetic material of the shaped charge being detonated. The acid does not exist prior to detonation of the shaped charge. Further, the amount of acid generated is sufficient to perform a specified operation. In some embodiments, the acid may corrode or dissolve foreign matter such as human-made debris so that this foreign matter may be expelled out of the tunnel by the flowing formation fluid. In other embodiments, the acid may corrode or dissolve a naturally occurring material such as rock or earth surrounding the tunnel. In still other embodiments, the acid may increase the permeability or porosity of the formation to enhance fluid mobility.

Figure 1:
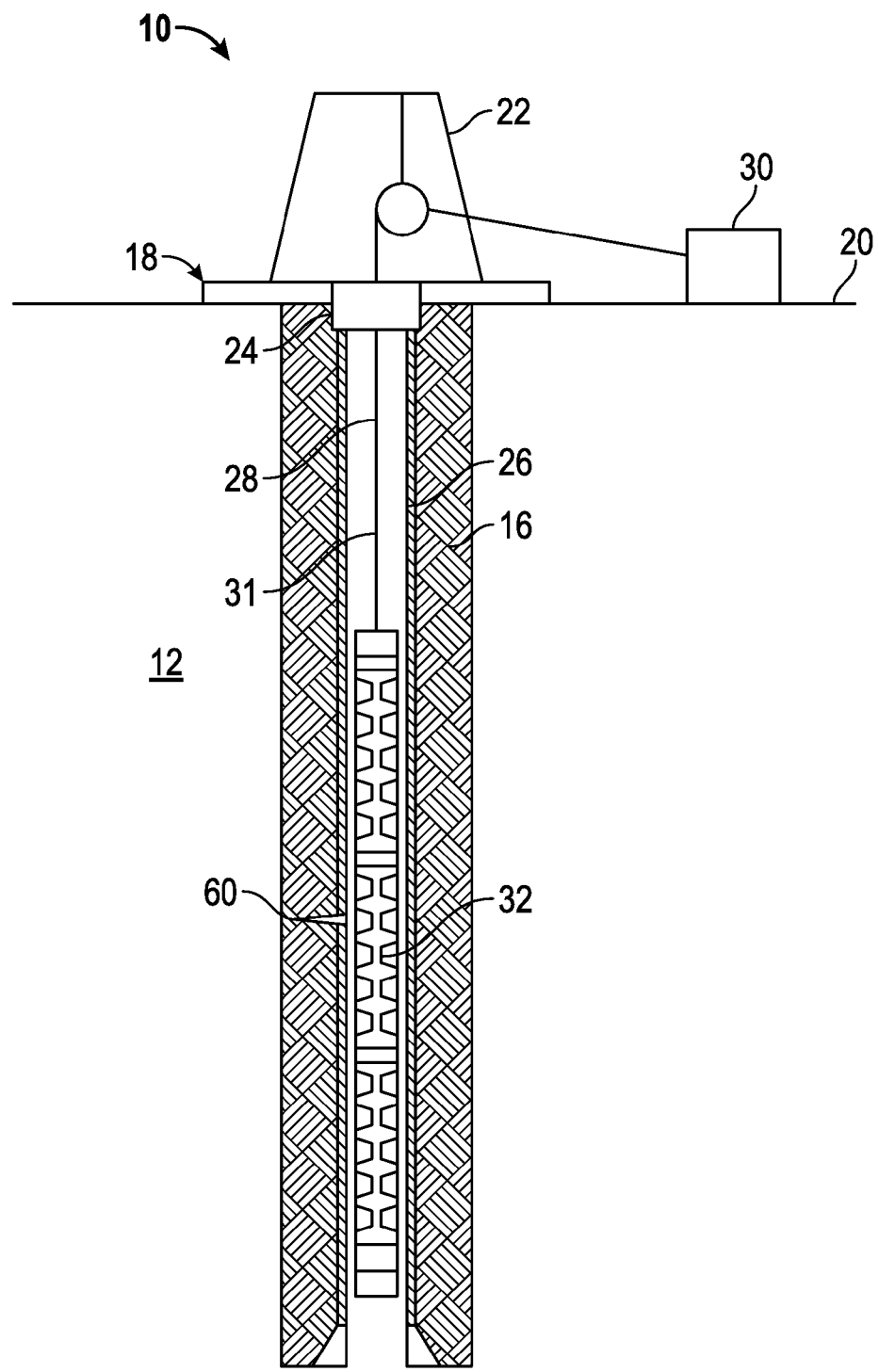
FIG. 1 is a schematic sectional view of one embodiment of an apparatus of the present disclosure as positioned within a well penetrating a subterranean formation.

Referring now to FIG. 1, there is shown a well construction and/or hydrocarbon production facility 10 positioned over a subterranean formation of interest 12. The facility can be a land-based or offshore rig adapted to convey a tool, such as a perforating gun train, in a well bore 16. The wellbore 16 can include open hole sections and/or cased and cemented sections. The facility 10 can include known equipment and structures such as a platform 18 at the earth's surface 20, a derrick 22, a wellhead 24, and casing 26. A work string 28 suspended within the well bore 16 from the derrick 22 is used to convey tooling into the wellbore 16. The work string 28 may include drill pipe, coiled tubing, wire line, slick line, or any other known conveyance means. Further, the work string 28 may be pulled through the wellbore by a device such as a wellbore tractor (not shown), which may be advantageous in extended reach wells or deviated wells. The work string 28 can include telemetry lines or other signal/power transmission mediums that establish one-way or two-way telemetric communication from the surface to a tool connected to an end of the work string 28. A suitable telemetry system (not shown) can be known as mud pulse, electrical signals, acoustic, or other suitable systems. For illustrative purposes, there is shown a telemetry system having a surface controller (e.g., a power source and/or firing panel) 30 adapted to transmit signals via a cable or signal transmission line 31 disposed in the work string 28. The signals can be analog or digital signals. In one embodiment of the present invention, a perforating gun 32 is coupled to an end of the work string 28. The perforating gun 32 may be the apparatus used to transport the device described in FIG. 1 into the borehole.

The perforating gun 32 may be an explosive train assembly that includes a detonator, detonating cord, and one or more shaped charges 33. When detonated in the wellbore, the charges will produce holes through the casing, cement, and into the surrounding formation. This detonation establishes communication between the formation and wellbore, providing a path for the formation fluids and gasses to be produced. The explosive train assembly may designed to operate in a predetermined timed sequence. Electric detonators may be used to detonate the detonating cord, which in turn detonates the charges in order from the top down or bottom up. Below is an exemplary method of deployment of a perforating gun 32 that may utilize one or more detonators according to the present disclosure.

Figure 2:
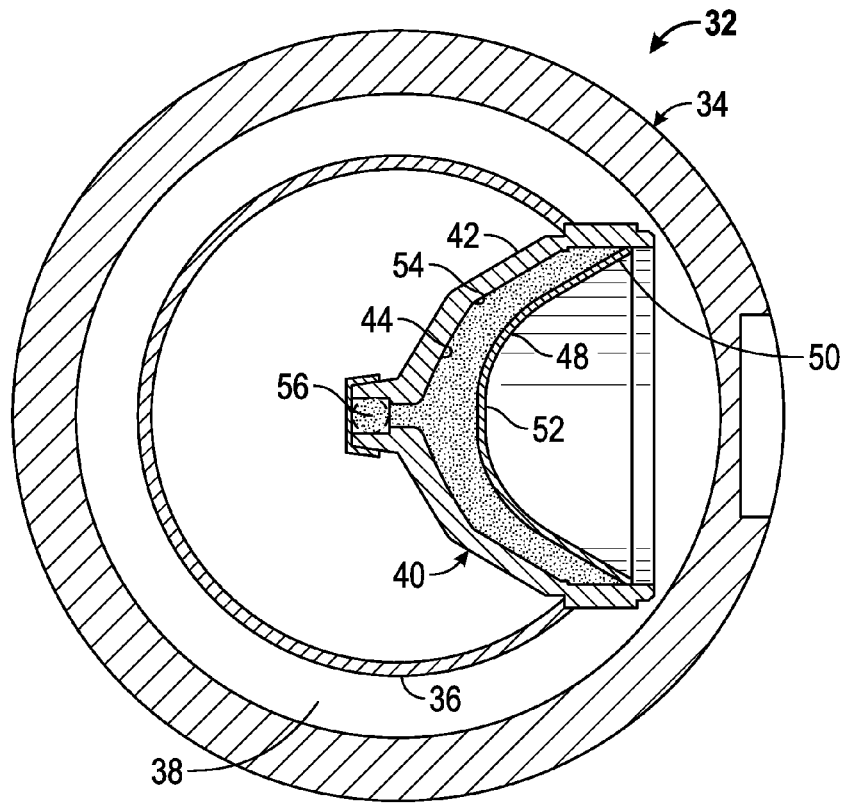
FIG. 2 is a schematic sectional view of a portion of a perforating gun shown in FIG. 1.

Referring to FIG. 2, a transverse cross section of a perforating gun assembly 32 is shown. The perforating gun assembly 32 has a tubular carrier 34 and a cylindrical charge tube 36 concentrically disposed within the tubular carrier 34. The outside diameter of the charge tube 36 is such that an annular space 38 is created between the charge tube 36 and the carrier 34. An explosive shaped charge 40 has a frusto-conical charge case 42. The charge case 42 is typically formed from steel, die cast aluminum, or zinc alloys and has an interior surface or wall 44 that defines a hollow interior of the charge case 42. The charge case 42 is open at the outer end and tapers inward. Disposed within the interior of the case 42 is a liner 48 having a generally conical or frusto-conical configuration. The liner 48 tapers inward from a base 50, located at the outer end, to a nose portion 52. The liner 48 is open at the base 50 and has a hollow interior. Disposed between the liner 48 and interior wall 44 of the casing 42 is an explosive material 54. The explosive material 54 extends from the interior of the case 42 through channel formed in the innermost end of the case 42. The case 42 receives a detonating cord 56 for detonating the explosive material 54 (FIG. 3) of the shaped charge 40.

Figure 3:
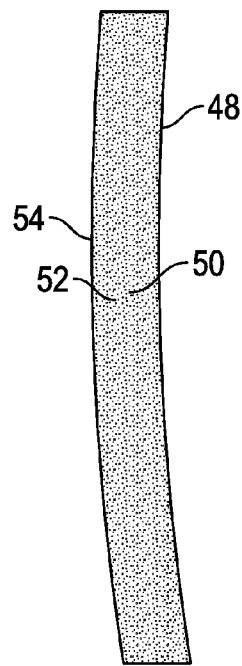
FIG. 3 is a sectional view of a liner made in accordance with one embodiment of the present disclosure.

FIG. 3 illustrates a sectional view of a liner 48 made in accordance with one embodiment of the present disclosure. When the shaped charges (FIG. 2) of the perforating gun assembly (FIG. 2) are detonated, the thermal energy and shock wave released by the explosive material 54 transforms the liner 48 into a molten jet that penetrates through the casing (not shown) in the wellbore and into the surrounding formation to form a perforation.

In embodiments of the present disclosure, the detonation of the explosive material 54 initiates the generation of one or more acids that are deposited into the tunnels formed by the jets. An illustrative tunnel is shown in FIG. 1 with numeral 60.

In one embodiment, the liner 48 may include an acid-generating material 50 for generating an acid. Specifically, the liner includes enough acid-generating material to generate enough acid to be functionally effective. By functionally effective, it is meant that the tunnel treated by the acid has a property or characteristic (e.g., permeability) that has been altered by a predetermined or desired amount. The acid-generating material 50 may be formed by the interaction of a first component and a second component. The first component may be or include a proton donor or positive ion. The second component is generally an aqueous solvent, in either liquid or gaseous form. It should be understood that the second component may store the aqueous solution in a solid form (e.g., a hydrate). The solid may be processed to form a liquid or a gas that interacts with the first component to form the acid.

In one arrangement, the acid-generating material 50 may include all the components needed to form an acid, e.g., the first component and the second component. In another arrangement, the liner 48 may include the first component that interacts with the second component in the gun 32 to form the acid. For example, the second component may be a material used to at least partially form the casing 42. Also, the second component may be a solid, liquid, or gas, located external to the liner 48 but internal to the carrier 34. In yet another variant, the second component may be a well fluid external to the carrier 34. In another arrangement, the liner 48 may include a first component that interacts with a naturally-occurring second component that is external to the carrier 34 and may be located in the wellbore 16 and/or the formation 12. The term "naturally occurring" refers to materials such as water, brine, and hydrocarbons that reside in the formation 16.

An acid may be defined as a substance that may act as a Lewis acid or Bronsted-Lowrey acid, including acids typically in the form of an aqueous solution. In one non-limiting instance, the acid-generating material may include a first component that may be configured to form an acid upon detonation of the explosive material. The first component may disassociate from the acid-generating material; upon disassociation, the first component may interact with the second component to form an acid.

The acid-generating material may include a catalyst configured to interact with a first component for generating an acid. The first component may be configured to react with a second component, e.g. a solvent, external to the liner for forming an acid in aqueous solution. The solvent or second component may be in the borehole, in the formation, or both.

In some embodiments, the acid generating material may include one or more components, such as but not limited to a proton donor or positive ion, a proton acceptor or negative ion, a catalyst, or materials that would aid in the acid formation upon detonation of the explosive material. It will be evident to those skilled in the art as to which aspects of the acid generating material may function as the proton donor (cation) or proton acceptor (anion). The components of the acid generating material may be or include, but are not limited to alumina, zeolites, sodium metabisulfite, potassium metabisulfite, copper(II) sulfate, vanadium (V) oxide, phosphorus chloride, thionyl chloride family, acyl chloride family, alkyl halide family, alkenyl halide family, aryl halide family, phosphorus, cobalt, chromium, manganese, peroxide family, naphtha, acetaldehyde, calcium fluoride, viton, Teflon™, oxalic acid, anhydrous glycerol, ethyl isonitrile, ethyl amine, chloroform, formyl fluoride, sodium formate, hydrocyanic acid, nitrophosphate, tricalcium phosphate, and combinations thereof. The acids generated may be, but not limited to, phosphoric acid, sulfuric acid, acetic acid, formic acid, phosphonic acid, and combinations thereof.

In some embodiments, the material 50 may be formulated to only react when exposed to a catalyst 52. The catalyst 52 may be disposed in an isolating material 54. The isolating material 54 initially prevents the interaction of the catalyst 52 with the other materials in the liner 48. The isolating material 54 may be selected to release the acid-generating material upon the occurrence of one or more conditions. For example, the isolating material 54 may be a metal that has a melting point below the temperatures encountered when the explosive material 44 is detonated. One illustrative, but not exclusive, isolating material is zinc. Upon detonation of the charge 40, the isolating material 54 may burn away, melt, dissolve, disintegrate or otherwise undergo a change in condition that allows the catalyst 52 to interact with the acid-generating material 50.

It should be appreciated that the isolating material 54 may also be used to isolate either or both of the first component and the second component. By isolation, it is meant that either or both of the components do not interact prior to detonation of the perforating gun. In certain embodiments, a catalyst material may be used to isolate either or both of the first component or the second component.

The liner 48 may also include a matrix material such as powder metals or powder metals blended with ductile materials such as aluminum, zinc, copper, tungsten, lead, bismuth, tantalum, tin, brass, molybdenum, etc. Materials such as plasticizers or binder may also be included in a material matrix of the liner 48. The liner 48 may also be formed of malleable solid or sheet metals such as copper, zinc, and Pfinodal.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. Thus, it is intended that the following claims be interpreted to embrace all such modifications and changes.

The invention claimed is:

1. An apparatus for perforating a subterranean formation, comprising:
   a casing having a slotted end and an open end;
   an energetic material disposed in the open end; and
   a liner enclosing the open end, the liner including:
   an acid-generating material having a first component, a second component, an isolating material isolating the first component from the second component, and a catalyst disposed in the isolating material, wherein the first component and the second component form an acid upon detonation of the explosive material.

2. The apparatus of claim 1, wherein the first component is selected from a group consisting of: alumina, zeolites, sodium metabisulfite, potassium metabisulfite, copper(II) sulfate, vanadium (V) oxide, phosphorus chloride, thionyl chloride family, acyl chloride family, alkyl halide family, alkenyl halide family, aryl halide family, phosphorus, cobalt, chromium, manganese, peroxide family, naphtha, acetaldehyde, calcium fluoride, polytetrafluoroethylene, fluorocarbon family, fluoroelastomer family, oxalic acid, anhydrous glycerol, ethyl isonitrile, ethyl amine, chloroform, formyl fluoride, sodium formate, hydrocyanic acid, nitrophosphate, tricalcium phosphate, and combinations thereof.

3. The apparatus of claim 1, wherein the first component forms the acid by interacting with the second component selected from a group consisting of: alumina, zeolites, sodium metabisulfite, potassium metabisulfite, copper(II) sulfate, vanadium (V) oxide, phosphorus chloride, thionyl chloride family, acyl chloride family, alkyl halide family, alkenyl halide family, aryl halide family, phosphorus, cobalt, chromium, manganese, peroxide family, naphtha, acetaldehyde, calcium fluoride, polytetrafluoroethylene, fluorocarbon family, fluoroelastomer family, oxalic acid, anhydrous glycerol, ethyl isonitrile, ethyl amine, chloroform, formyl fluoride, sodium formate, hydrocyanic acid, nitrophosphate, tricalcium phosphate, and combinations thereof.

4. The apparatus of claim 1, wherein the second component is solid.

5. The apparatus of claim 1, wherein the isolating material prevents interaction between the first component and the second component until the detonation.

6. The apparatus of claim 1, wherein the isolating material includes zinc.

7. The apparatus of claim 1, wherein the first component dissociates to form an acid when exposed to the second component.

8. The apparatus of claim 1, further comprising:
   a detonator cord connected to the casing;
   a detonator connected to the detonator cord;
   a charge tube attached to the casing; and
   a tubular carrier receiving the charge tube.

9. The apparatus of claim 8, further comprising a work string suspended within the wellbore and telemetry lines and conveying the tubular carrier.

10. An apparatus for dispersing acid into a subterranean formation using a tubular carrier configured to be conveyed into a wellbore, comprising:
    a casing having a slotted end and an open end;
    an energetic material disposed in the open end;
    a liner enclosing the open end;
    an acid-generating material having a first component and a second component, which are disposed in the tubular carrier;
    an isolating material isolating the first component from the second component; and
    a catalyst for generating acid wherein the catalyst is disposed in the isolating material.

11. The apparatus of claim 10, wherein the isolating material reacts to a detonation of the energetic material by allowing the first component to interact with the second component.

12. The apparatus of claim 10, wherein the liner encloses at least one of the first component and the second component.

13. The apparatus of claim 10, wherein the isolating material prevents interaction between the first component and the second component until the detonation.

14. The apparatus of claim 10, wherein the isolating material includes zinc.

15. The apparatus of claim 10, further comprising a detonator cord connected to the casing.

16. The apparatus of claim 15, further comprising a detonator connected to the detonator cord, and a charge tube attached to the casing, wherein the charge tube is located in the tubular carrier.

17. The apparatus of claim 16, further comprising a work string suspended within the wellbore and telemetry lines and conveying the tubular carrier.

18. The apparatus of claim 10, wherein the first component dissociates to form an acid when exposed to the second component.

19. The apparatus of claim 10, wherein the acid generating material is selected from a group consisting of: alumina, zeolites, sodium metabisulfite, potassium metabisulfite, copper(II) sulfate, vanadium (V) oxide, phosphorus chloride, thionyl chloride family, acyl chloride family, alkyl halide family, alkenyl halide family, aryl halide family, phosphorus, cobalt, chromium, manganese, peroxide family, naphtha, acetaldehyde, calcium fluoride, polytetrafluoroethylene, fluorocarbon family, fluoroelastomer family, oxalic acid, anhydrous glycerol, ethyl isonitrile, ethyl amine, chloroform, formyl fluoride, sodium formate, hydrocyanic acid, nitrophosphate, tricalcium phosphate, and combinations thereof.

20. The apparatus of claim 10, wherein the second component is an aqueous fluid.

* * * * *